Figure 1:
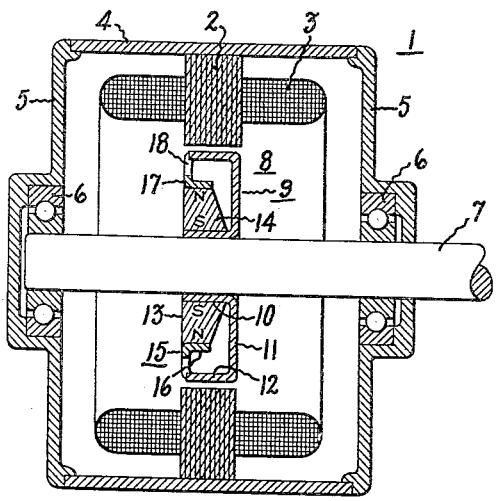

Dec. 18, 1951     D. D. HERSHBERGER     2,579,318
ROTOR FOR DYNAMOELECTRIC MACHINE

Filed Dec. 28, 1950

Inventor:
Doran Hershberger,
by Ernest H. Britton
His Attorney.

Patented Dec. 18, 1951

2,579,318

UNITED STATES PATENT OFFICE 2,579,318

ROTOR FOR DYNAMOELECTRIC MACHINE

Doran D. Hershberger, Fort Wayne, Ind., assignor to General Electric Company, a corporation of New York Application December 28, 1950, Serial No. 203,155

6 Claims. (Cl. 172—120)

This invention relates to rotors for dynamoelectric machines and more particularly to permanent magnet excited rotors of the Lundel type.

Permanent magnet excited rotors of the Lundel type have conventionally been constructed utilizing an axially polarized permanent magnet with toothed pole piece members abutting the sides thereof. This construction requires a separate nonmagnetic sleeve member to isolate the permanent magnet from a magnetic shaft and different pole piece punchings must be used for each machine rating by virtue of the different lengths of permanent magnet utilized. In machines of this type the stator stacking is independent of the length of the permanent magnet, the required m. m. f. determining the magnet length while the output determines the stacking length. These two factors do not usually agree and therefore the longer length necessarily determines the overall length of the machine. Furthermore, the nonmagnetic sleeve or spacer may cause difficulty because of the differential expansion when the temperature range is large. In addition, end pieces are required to hold the rotor assembly together. It is, therefore, desirable to provide a permanent magnet rotor of the Lundel type in which the same rotor punchings may be utilized for a substantial range of magnet lengths and in which the stator stacking length and magnet length may be properly proportioned without consideration to each other. Furthermore, it is desirable to provide a rotor construction in which a nonmagnetic spacer is not required.

An object of this invention is to provide an improved permanent magnet rotor of the Lundel type.

Another object of this invention is to provide an improved permanent magnet rotor of the Lundle type in which a nonmagnetic shaft spacer is not required.

A further object of this invention is to provide an improved permanent magnet rotor of the Lundel type in which the same rotor punchings may be utilized for various permanent magnet lengths.

Further objects and advantages of this invention will become apparent and the invention will be better understood by reference to the following description and the accompanying drawing and the features of novelty which characterize this invention will be pointed out with particularity in the claims annexed to and forming a part of the specification.

In accordance with this invention, there is provided a first pole piece member having an annular hub portion adapted for mounting on a shaft and an annular web portion. A plurality of evenly spaced axially extending teeth are formed on the outer periphery of the web portion extending in the same direction as the hub portion. A radially polarized annular permanent magnet is mounted on the hub portion of the first pole piece member and is spaced from the web portion thereof. A second pole piece member is provided having an annular hub portion mounted on the outer periphery of the permanent magnet and an annular web portion spaced from the web portion of the first pole piece member. A plurality of evenly spaced axially extending teeth are formed on the outer periphery of the web portion of the second pole piece member extending toward the first pole piece member and intermeshed with the teeth thereof.

Figure 2:
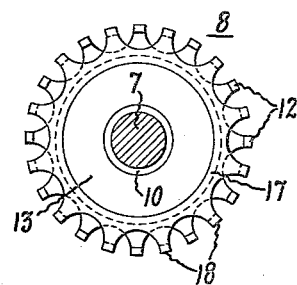
Figure 3:
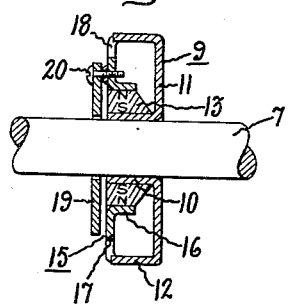
Figure 4:
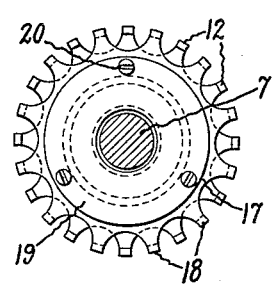

In the drawing, Fig. 1 is a side elevational view, partly in section, illustrating the improved rotor of this invention installed in a dynamoelectric machine; Fig. 2 is an end view of the improved rotor of Fig. 1; Fig. 3 is a side elevational view partly in section of the rotor of Fig. 1 provided with a keeper and output control means; and Fig. 4 is an end view of the rotor of Fig. 3.

Referring now to Figs. 1 and 2, there is shown a dynamoelectric machine generally identified as 1 having a stator member 2 formed of a plurality of relatively thin laminations of magnetic material. A suitable winding 3 is arranged in slots in the stator 2 (not shown). The stator 2 is mounted in any suitable manner in a frame member 4 and end shields 5 support bearings 6 in which shaft 7 is journaled. Either frame member 4, or end shields 5, must be formed of nonmagnetic material.

A rotor member 8 is mounted within the stator member 2 and includes a first pole piece member 9 having an annular hub portion 10 mounted on the shaft 7 by a press fit. An annular web portion 11 extends radially outward from the hub portion 10 and a plurality of evenly spaced teeth 12 are formed at its outer periphery extending axially in the same direction as the hub portion 10. A radially polarized permanent magnet 13 is mounted on the hub portion 10 of the first pole piece member 9 with a press fit and its side 14 is spaced from the web portion 11 and slopes outwardly away therefrom. A second pole piece member 15 is provided having an annular hub portion 16 mounted on the cylindrical outer periphery of the permanent magnet 13 by a press fit. A web portion 17 extends outwardly from the hub portion 16 on the side thereof remote from the first pole piece member 9 and a plurality of evenly spaced teeth 18 are formed on its outer periphery extending axially toward the first pole piece member 9 and intermeshed with the teeth 12.

It will now be readily apparent that with this improved rotor construction the punchings for the pole piece members 9 and 15 may be identical for a number of different machine ratings since different axial length permanent magnets may be utilized with the same punchings. Furthermore, the stator stacking length and the magnet length need not be made the same since the length of the teeth 12 and 18 need not correspond to the length of the permanent magnet 13. It will be readily seen that with this construction the rotor 8 may be pressed directly on the shaft 7, no nonmagnetic spacer being needed by virtue of the radial polarization of the permanent magnet 13. This permits a more effective utilization of space and eliminates difficulties encountered with a magnetic spacer due to differential expansion. It will also be readily seen that no end pieces are required to hold the rotor assembly together since all components may be assembled with a press fit.

It is desirable in a machine of this type to provide means for preventing demagnetization of the permanent magnet when the rotor is removed from the stator and furthermore, if the machine is to be used as a generator, to control the output voltage. Referring now to Figs. 3 and 4, in which like parts are indicated by like reference numerals, there is shown a rotor having a first pole piece member 9 comprising a hub portion 10 mounted on shaft 7 and a web portion 11 having a plurality of evenly spaced, axially extending teeth 12 formed on its outer periphery. Permanent magnet 13 is mounted on the hub portion 10 and is polarized radially. A second pole piece member 15 is provided comprising a hub portion 16 mounted on the outer periphery of the permanent magnet 13 and a web portion 17 having a plurality of evenly spaced axially extending teeth 18 formed on its outer periphery intermeshed with the teeth 12 of the first pole piece member 9. In order to provide a keeper for diverting a portion of the flux from the permanent magnet 13 to protect it from demagnetization when the rotor is removed from the stator and to control the output voltage when the machine is used as a generator, an annular ring 19 is provided adjustably secured to the web portion 17 of the second pole piece member 15 by a plurality of screws 20. This ring, it will be readily seen, provides a shunt gap for the permanent magnet 13 which will prevent its demagnetization when the rotor is removed from the stator and which furthermore will permit adjustment of the output voltage of the machine by diverting a portion of the flux.

It will now be readily apparent that this invention provides an improved permanent magnet excited rotor of the Lundel type which is characterized by its simplicity and ease of assembly and its compact arrangement of components.

While I have shown and described specific embodiments of this invention, further modifications and improvements thereof will occur to those skilled in the art. I desire it to be understood, therefore, that this invention is not limited to the specific forms shown and I intend in the appended claims to cover all modifications which do not depart from the spirit and scope of this invention.

What I claim as new and desire to secure by Letters Patent of the United States is:

1. A rotor for a dynamoelectric machine comprising a first pole piece member including an annular hub portion adapted to be mounted on a shaft and an annular web portion, said web portion having a plurality of evenly spaced axially extending teeth formed on its outer periphery, an annular permanent magnet mounted on said hub portion of said first pole piece member, and a second pole piece member having an annular hub portion mounted on the peripheral surface of said permanent magnet and an annular web portion, said last named web portion having a plurality of evenly spaced axially extending teeth formed on its outer periphery intermeshed with said teeth of said first pole piece member.

2. A rotor for a dynamoelectric machine comprising a first pole piece member including an annular hub portion adapted to be mounted on a shaft and an annular web portion, said web portion having a plurality of evenly spaced axially extending teeth formed on its outer periphery, an annular permanent magnet mounted on said hub portion of said first pole piece member and polarized radially, and a second pole piece member having an annular hub portion mounted on the peripheral surface of said permanent magnet and an annular web portion, said last named web portion having a plurality of evenly spaced axially extending teeth formed on its outer periphery intermeshed with said teeth of said first pole piece member, the axial face of said permanent magnet adjacent said web portion of said first pole piece member sloping outwardly away from said last named web portion.

3. A rotor for a dynamoelectric machine comprising a first pole piece member including an annular hub portion adapted to be mounted on a shaft and an annular web portion, said web portion having a plurality of evenly spaced teeth formed on its outer periphery extending axially in the same direction as said hub portion, a radially polarized annular permanent magnet mounted on said hub portion and spaced from said web portion, and a second pole piece member having an annular hub portion mounted on the outer periphery of said permanent magnet and an annular web portion spaced from said web portion of said first pole piece member, said web portion of said second pole piece member having a plurality of evenly spaced teeth formed on its outer periphery extending axially toward said first pole piece member and intermeshed with the teeth thereof.

4. A rotor for a dynamoelectric machine comprising a first pole piece member including an annular hub portion adapted to be mounted on a shaft, a radially polarized annular permanent magnet mounted on said hub portion and having a cylindrical peripheral surface, said first pole piece member having an annular web portion extending outwardly from said hub portion on one side of said permanent magnet and beyond the outer periphery thereof, said web portion being spaced from said one side of said permanent magnet and having a plurality of evenly spaced teeth formed on its outer periphery extending axially in the same direction as said hub portion, and a second pole piece member having an annular hub portion mounted on the peripheral surface of said permanent magnet, said second pole piece member having an annular web portion extending outwardly from the side of said last named hub portion remote from said web portion of said first pole piece member, said web portion of said second pole piece member having a plurality of evenly spaced teeth formed on its outer periphery extending axially toward said first pole piece member and intermeshed with the teeth thereof.

5. A rotor for a dynamoelectric machine comprising a first pole piece member including an annular hub portion adapted to be mounted on a shaft and an annular web portion, said web portion having a plurality of evenly spaced axially extending teeth formed on its outer periphery, an annular permanent magnet mounted on said hub portion of said first pole piece member, a second pole piece member having an annular hub portion mounted on the peripheral surface of said permanent magnet and an annular web portion, said last named web portion having a plurality of evenly spaced axially extending teeth formed on its outer periphery intermeshed with said teeth of said first pole piece member, and means on one of said pole piece members for diverting a portion of the flux from said permanent magnet whereby said permanent magnet is protected against demagnetization and the output of said rotor may be adjusted.

6. A rotor for a dynamoelectric machine comprising a first pole piece member including an annular hub portion adapted to be mounted on a shaft, a radially polarized annular permanent magnet mounted on said hub portion and having a cylindrical peripheral surface, said first pole piece member having an annular web portion extending outwardly from said hub portion on one side of said permanent magnet and beyond the outer periphery thereof, said web portion being spaced from said one side of said permanent magnet and having a plurality of evenly spaced teeth formed on its outer periphery extending axially in the same direction as said hub portion, a second pole piece member having an annular hub portion mounted on the peripheral surface of said permanent magnet, said second pole piece member having an annular web portion extending outwardly from the side of said last named hub portion remote from said web portion of said first pole piece member, said web portion of said second pole piece member having a plurality of evenly spaced teeth formed on its outer periphery extending axially toward said first pole piece member and intermeshed with the teeth thereof, and an annular member adjustably secured to said web portion of said second pole piece member and spaced from the other side of said permanent magnet for diverting a portion of the flux from said permanent magnet whereby said permanent magnet is protected against demagnetization and the output of said rotor may be adjusted.

DORAN D. HERSHBERGER.

No references cited.